US010836440B2

United States Patent
Konno et al.

(10) Patent No.: US 10,836,440 B2
(45) Date of Patent: Nov. 17, 2020

(54) INSTRUMENT PANEL BEAM, PAIR OF BRACKETS, AND INSTRUMENT PANEL BEAM ASSEMBLY

(71) Applicants: UACJ CORPORATION, Tokyo (JP); UACJ EXTRUSION CORPORATION, Tokyo (JP)

(72) Inventors: Yutaro Konno, Tokyo (JP); Akira Nishikawa, Tokyo (JP); Yasuyuki Tanaka, Tokyo (JP); Toshiaki Doi, Tochigi (JP)

(73) Assignees: UACJ CORPORATION, Tokyo (JP); UACJ EXTRUSION CORPORATION, Tokyo (JP)

(*) Notice: Subject to any disclaimer, the term of this patent is extended or adjusted under 35 U.S.C. 154(b) by 0 days.

(21) Appl. No.: 16/316,505

(22) PCT Filed: Jan. 17, 2018

(86) PCT No.: PCT/JP2018/001267
§ 371 (c)(1),
(2) Date: Jan. 9, 2019

(87) PCT Pub. No.: WO2018/142941
PCT Pub. Date: Aug. 9, 2018

(65) Prior Publication Data
US 2019/0337573 A1    Nov. 7, 2019

(30) Foreign Application Priority Data

Jan. 31, 2017   (JP) .................................. 2017-016128

(51) Int. Cl.
*B62D 25/14*   (2006.01)
*B21C 37/16*   (2006.01)

(52) U.S. Cl.
CPC ............ *B62D 25/145* (2013.01); *B21C 37/16* (2013.01)

(58) Field of Classification Search
CPC ........................... B62D 25/145; B62D 25/147
(Continued)

(56) References Cited

U.S. PATENT DOCUMENTS 6,651,477 B2 * 11/2003  Humphries ............ B21D 41/02
                                                          72/370.06
6,817,382 B2 * 11/2004  Tanaka .................. B62D 25/145
                                                          138/109

(Continued)

FOREIGN PATENT DOCUMENTS

| JP | 5293535 A | 11/1993 |
| JP | 2001253368 A | 9/2001 |
| JP | 2009274654 A | 11/2009 |

OTHER PUBLICATIONS

Machine Translation of JP2001253368A, printed fromt the JPO website, Mar. 2, 2020.*
(Continued)

*Primary Examiner* — Jason S Morrow
(74) *Attorney, Agent, or Firm* — Greer Burns & Crain Ltd.

(57) ABSTRACT

An instrument panel beam is the instrument panel beam that is arranged in the width direction of an automobile, and includes: a large-diameter hollow tube having a hollow cylindrical shape; and a small-diameter hollow tube which is joined to the large-diameter hollow tube in an axial direction, has a diameter that is smaller than that of the large-diameter hollow tube, and has a hollow cylindrical shape. The small-diameter hollow tube includes two flat plates that extend in a longitudinal direction and two bends that are curved in a circumferential direction, and the flat plates and
(Continued)

the bends are alternately arranged in the circumferential direction.

7 Claims, 8 Drawing Sheets

(58) Field of Classification Search
USPC .................................................. 296/193.02
See application file for complete search history.

(56) References Cited

U.S. PATENT DOCUMENTS

| | | | |
|---|---|---|---|
| 2002/0005058 A1* | 1/2002 | Humphries | B21D 41/02 |
| | | | 72/370.06 |
| 2002/0100243 A1* | 8/2002 | Hein | B62D 25/145 |
| | | | 52/655.1 |
| 2005/0134090 A1 | 6/2005 | Kring et al. | |
| 2011/0278876 A1 | 11/2011 | Hitz et al. | |
| 2012/0032044 A1* | 2/2012 | Ruiz Rincon | B62D 25/145 |
| | | | 248/205.3 |
| 2017/0349218 A1* | 12/2017 | Nishimura | B62D 25/145 |
| 2018/0072351 A1* | 3/2018 | Kaneko | B62D 25/145 |
| 2018/0194397 A1* | 7/2018 | Someya | B62D 21/15 |
| 2019/0016395 A1* | 1/2019 | Kajikawa | B62D 1/187 |
| 2019/0031246 A1* | 1/2019 | Kajikawa | B62D 25/145 |
| 2019/0225280 A1* | 7/2019 | Nishizawa | B62D 25/145 |
| 2019/0300040 A1* | 10/2019 | Abe | B62D 1/16 |

OTHER PUBLICATIONS

ISR issued in Int'l. App. No. PCT/JP2018/001267, dated Feb. 13, 2018.

EESR issued in corresponding EP patent application No. 18747580.1, dated Sep. 21, 2020.

* cited by examiner

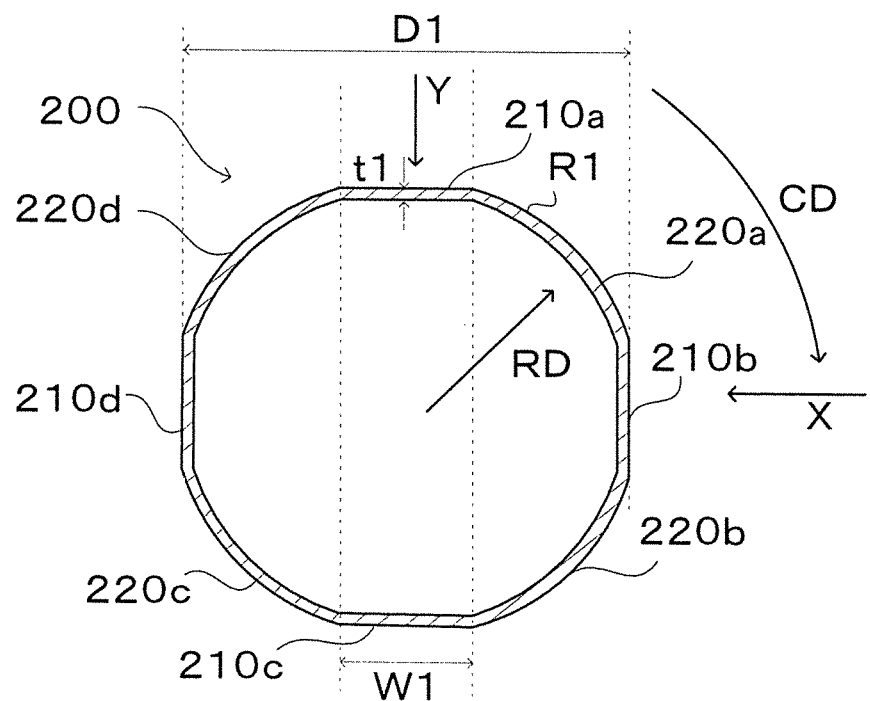
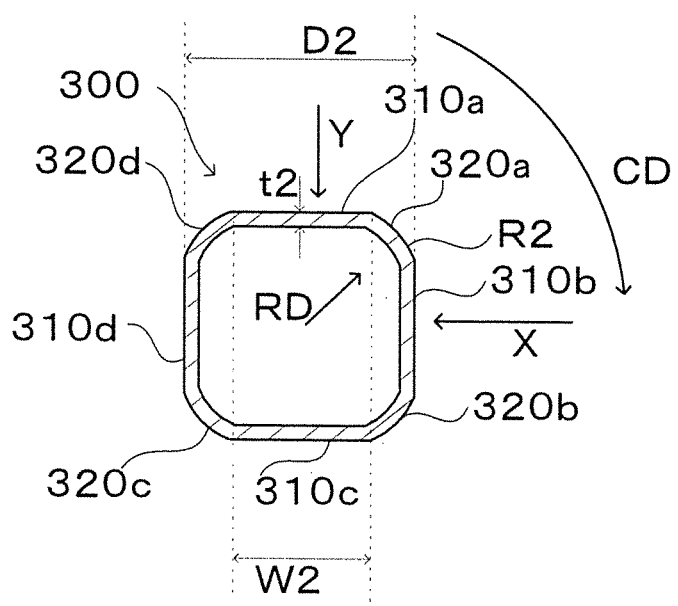

INSTRUMENT PANEL BEAM, PAIR OF BRACKETS, AND INSTRUMENT PANEL BEAM ASSEMBLY

This is a National Phase Application filed under 35 U.S.C. § 371, of International Application No. PCT/JP2018/001267, filed Jan. 17, 2018, the contents of which are incorporated by reference.

TECHNICAL FIELD

The present disclosure relates to an instrument panel beam, a pair of brackets, and an instrument panel beam assembly.

BACKGROUND ART

Instrument panel beams are used as members that reinforce instrument panels included in automotive bodies. An instrument panel beam is a member that includes a hollow material having a circular cross section, that has a shape in which a large-diameter portion and a small-diameter portion are joined to each other in an axial direction, and that is arranged through a bracket in the width direction of an automobile. In order to reduce the masses of automobiles, instrument panel beams are also desired to have lowered masses and are formed of metals such as aluminum.

Cited Literature 1 discloses a production method of producing an instrument panel beam including a cylindrically-shaped hollow material in which a large-diameter portion and a small-diameter portion are joined to each other in an axial direction by drawing processing. The drawing processing is cold working in which a hollow material which is a material is drawn through a die, thereby allowing the hollow material to have a cross-sectional shape equal to that of the hole of the die.

CITATION LIST

Patent Literature

Patent Literature 1: Unexamined Japanese Patent Application Kokai Publication No. H5-293535

SUMMARY OF INVENTION

Technical Problem

An instrument panel beam is desired to have high torsional rigidity and high flexural rigidity in a gravity direction in order to improve residence stability during automobile travel. High flexural rigidity against force applied from the front of a vehicle is also desired for protecting an occupant in a collision. An instrument panel beam produced by the production method of Cited Literature 1 has a cylindrical shape, and an increase in the wall thickness of the instrument panel beam is required to increase flexural rigidity and torsional rigidity against force applied from the front of a vehicle. There is a problem in that the mass of the instrument panel beam is increased by increasing the wall thickness.

The present disclosure was made under such actual circumstances with an objective of providing: an instrument panel beam that has high torsional rigidity and high flexural rigidity and has a small mass; a pair of brackets; and an instrument panel beam assembly.

Solution to Problem

In order to achieve the above-described objective, an instrument panel beam according to a first aspect of the present disclosure is an instrument panel beam that extends in the width direction of an automobile, the instrument panel beam including:

a large-diameter hollow tube having a hollow cylindrical shape; and a small-diameter hollow tube having a diameter that is smaller than that of the large-diameter hollow tube and having a hollow cylindrical shape, wherein the large-diameter hollow tube and the small-diameter hollow tube are joined to each other in an axial direction, and the small-diameter hollow tube includes at least two flat plates that extend in a longitudinal direction and at least two bends that are curved in a circumferential direction, the flat plates and the bends being alternately arranged in the circumferential direction.

The large-diameter hollow tube may include at least two flat plates that extend in a longitudinal direction and at least two bends that are curved in a circumferential direction, the flat plates and the bends being alternately arranged in the circumferential direction.

The at least two bends of the large-diameter hollow tube may have a curved surface shape that is convex outward in a radial direction.

The at least two bends of the small-diameter hollow tube may have a curved surface shape that is convex outward in a radial direction.

A reduced diameter portion of which the diameter is reduced from one end to another end may be included, wherein the one end of the reduced diameter portion may be fixed to an end of the large-diameter hollow tube, and the other end may be fixed to an end of the small-diameter hollow tube.

The curvature radius of the bends of the large-diameter hollow tube may be larger than the curvature radius of the bends of the small-diameter hollow tube.

In order to achieve the above-described objective, a pair of brackets according to a second aspect of the present disclosure are a pair of brackets into which the instrument panel beam is fit, the pair of brackets including:

a first bracket including an opening into which the large-diameter hollow tube of the instrument panel beam is fit; and a second bracket including an opening into which the small-diameter hollow tube of the instrument panel beam is fit.

In order to achieve the above-described objective, an instrument panel beam assembly according to a third aspect of the present disclosure includes:

the instrument panel beam;

a first bracket including an opening into which the large-diameter hollow tube of the instrument panel beam is fit; and a second bracket including an opening into which the small-diameter hollow tube of the instrument panel beam is fit, wherein the instrument panel beam is fit into the first bracket and the second bracket.

Advantageous Effects of Invention

According to the present disclosure, there can be provided: an instrument panel beam that has high torsional rigidity and high flexural rigidity and has a small mass; a pair of brackets; and an instrument panel beam assembly.

BRIEF DESCRIPTION OF DRAWINGS

FIG. 3 is a cross-sectional view taken along the line of FIG. 2;

FIG. 4 is a cross-sectional view taken along the line IV-IV of FIG. 2;

DESCRIPTION OF EMBODIMENTS

An instrument panel beam assembly according to an embodiment of the present disclosure will be described below with reference to the drawings.

Figure 1:
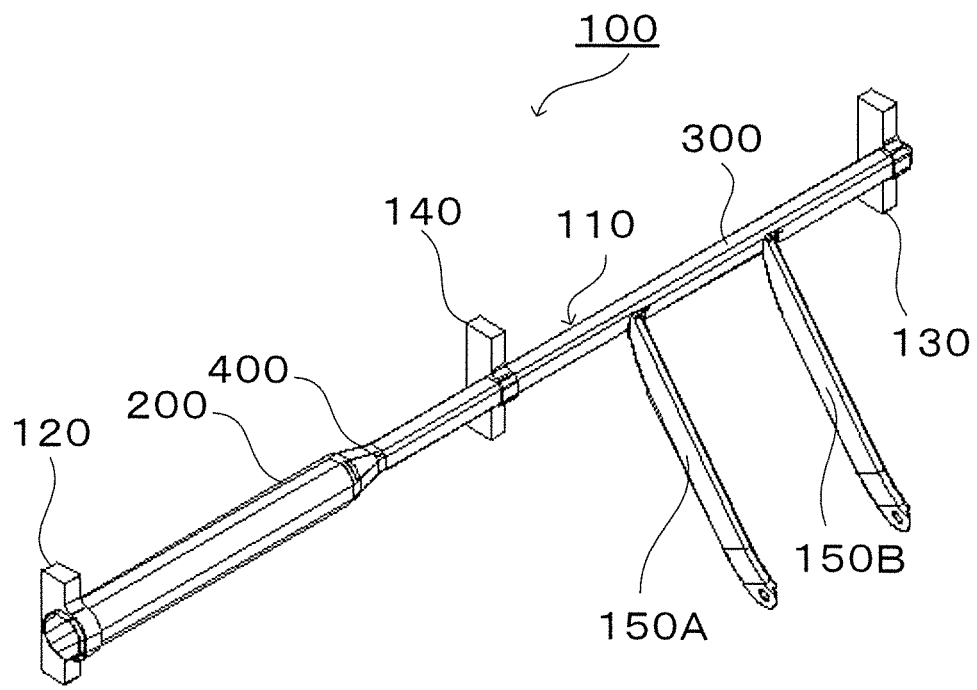
FIG. 1 is a view illustrating an instrument panel beam assembly according to an embodiment.

The instrument panel beam assembly 100 of the present embodiment is a member that is arranged to extend in the width direction of an automobile, as a member that reinforces an instrument panel. The instrument panel beam assembly 100 includes an instrument panel beam 110, a first bracket 120, a second bracket 130, a third bracket 140, and stays 150A and 150B, as illustrated in FIG. 1.

Figure 2:
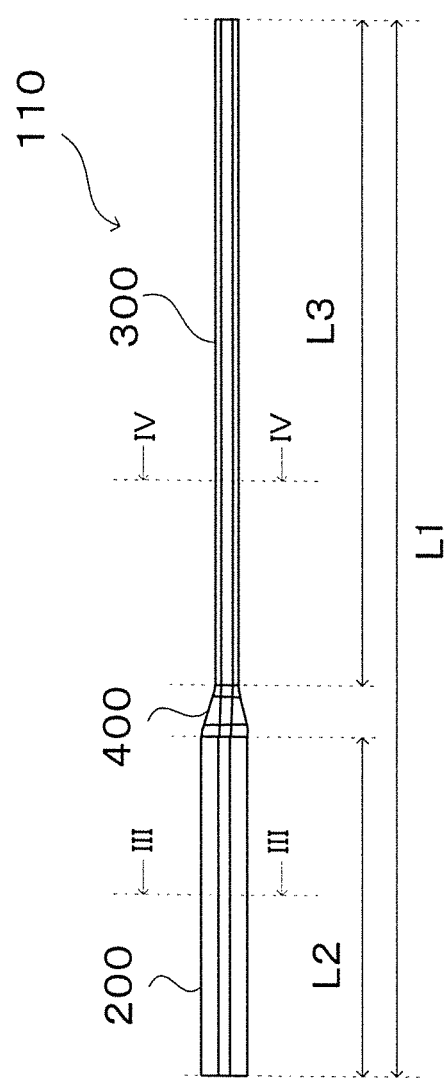
FIG. 2 is a view illustrating an instrument panel beam according to an embodiment.

The instrument panel beam 110 includes aluminum or an aluminum alloy (hereinafter referred to as "aluminum alloy or the like"), and includes a large-diameter hollow tube 200, a small-diameter hollow tube 300 having a diameter that is smaller than that of the large-diameter hollow tube 200, and a reduced diameter portion 400 through which the large-diameter hollow tube 200 and the small-diameter hollow tube 300 are connected to each other, as illustrated in FIG. 2. The large-diameter hollow tube 200, the reduced diameter portion 400, and the small-diameter hollow tube 300 are joined in an axial direction and integrally molded. The full length L1 of the instrument panel beam 110 depends on the size of an automobile on which the instrument panel beam is mounted, and is, for example, 1400 to 1700 mm. The large-diameter hollow tube 200 is a portion on which a steering column is mounted, and torsional rigidity and flexural rigidity are secured by increasing the diameter of the large-diameter hollow tube. The small-diameter hollow tube 300 is a portion arranged in a passenger side, and a larger space in an instrument panel in the passenger side can be secured by decreasing the diameter of the small-diameter hollow tube. In order to secure the larger space in the instrument panel, a part other than the portion on which the steering column is mounted is preferably allowed to be the small-diameter hollow tube 300, and the length L3 of the small-diameter hollow tube 300 is, for example, 1.0 to 2.5 times the length L2 of the large-diameter hollow tube 200.

The large-diameter hollow tube 200 has a hollow cylindrical shape and includes flat plates 210a, 210b, 210c, and 210d that extend in a longitudinal direction as well as bends 220a, 220b, 220c, and 220d that are curved in a circumferential direction CD, as illustrated in FIG. 3. The large-diameter hollow tube 200 particularly requires torsional rigidity and therefore preferably has a cross-sectional shape similar to a circular shape, and the width W1 of the flat plates 210a and 210c is preferably one-third or less of an outer diameter D1. The flat plates 210a, 210b, 210c, and 210d and the bends 220a, 220b, 220c, and 220d are alternately arranged in the circumferential direction CD. The flat plate 210a is parallel to the flat plate 210c. The flat plate 210a and the flat plate 210c face each other. The flat plate 210d is parallel to the flat plate 210b. The flat plate 210d and the flat plate 210b face each other. The large-diameter hollow tube 200 includes the flat plates 210a, 210b, 210c, and 210d, whereby flexural rigidity against force applied from a Y-direction due to gravity and flexural rigidity against force applied from an X-direction (the front of a vehicle) in a frontal collision of the vehicle can be increased. The bends 220a, 220b, 220c, and 220d have a curved surface shape that is convex outward in a radial direction RD. The outer periphery portions of the bends 220a, 220b, 220c, and 220d include a cylindrical surface having a curvature radius R1. The large-diameter hollow tube 200 preferably has an outer diameter D1 of 50 to 100 mm and preferably has a thickness t1 of 1 to 5 mm in order to decrease the mass of the large-diameter hollow tube 200 while securing the torsional rigidity and flexural rigidity of the large-diameter hollow tube 200.

The small-diameter hollow tube 300 has a hollow cylindrical shape and includes flat plates 310a, 310b, 310c, and 310d that extend in a longitudinal direction as well as bends 320a, 320b, 320c, and 320d that are curved in a circumferential direction CD, as illustrated in FIG. 4. The flat plates 310a, 310b, 310c, and 310d and the bends 320a, 320b, 320c, and 320d are alternately arranged in the circumferential direction CD. The flat plate 310a is parallel to the flat plate 310c. The flat plate 310a and the flat plate 310c face each other. The flat plate 310d is parallel to the flat plate 310b. The flat plate 310d and the flat plate 310b face each other. The small-diameter hollow tube 300 requires flexural rigidity against a frontal collision, and therefore, the width W2 of the flat plates 310a and 310b of which the principal surfaces are horizontally arranged when the small-diameter hollow tube 300 is arranged in an automobile is preferably greater than the width W1 of the flat plates 210a and 210c of the large-diameter hollow tube 200. Flexural rigidity against force applied from an X-direction in a frontal collision can be increased by allowing the width W2 of the flat plates 310a and 310b to be large. The small-diameter hollow tube 300 includes the flat plates 310a and 310c, whereby flexural rigidity against force applied from a Y-direction due to gravity can be increased. The bends 320a, 320b, 320c, and 320d have a curved surface shape that is convex outward in a radial direction RD. The outer periphery portions of the bends 320a, 320b, 320c, and 320d include a cylindrical surface having a curvature radius R2. The curvature radius R2 of the bends 320a, 320b, 320c, and 320d is preferably smaller than the curvature radius R1 of the flat plates 210a, 210b, 210c, and 210d of the large-diameter hollow tube 200. As a result, flexural rigidity against force applied from the X-direction can be increased. The small-diameter hollow tube 300 preferably has an outer diameter D2 that is ⅓ to ⅔ of the outer diameter D1 of the large-diameter hollow tube 200 and preferably has a thickness t2 of 1 to 4 mm in order to decrease the mass of the small-diameter hollow tube 300 while securing the torsional rigidity and flexural rigidity of the small-diameter hollow tube 300. In addition, the thickness t2 is preferably 1 to 2 mm smaller than the thickness t1.

The reduced diameter portion 400 includes one end having the same shape as the cross-sectional shape of the large-diameter hollow tube 200 and another end having the same shape as the cross-sectional shape of the small-diameter hollow tube 300, and is formed to have a cylindrical shape of which the diameter is reduced from the one end to the other end. The one end of the reduced diameter portion 400 is fixed to one end of the large-diameter hollow tube 200. The other end of the reduced diameter portion 400 is fixed to one end of the small-diameter hollow tube 300.

Referring again to FIG. 1, the first bracket 120 is mounted on another end of the large-diameter hollow tube 200. The second bracket 130 is mounted on another end of the small-diameter hollow tube 300, and the third bracket 140 is mounted closer to the one end than the center of the small-diameter hollow tube 300. The first bracket 120 is a portion fixed to the right of the skeleton of an automobile body, while the second bracket 130 is a portion fixed to the left of the skeleton of an automobile body. The terms "right" and "left" used here refer to "right" and "left", respectively, with respect to the direction of travel of an automobile on which the instrument panel beam assembly 100 is mounted.

Figure 5:
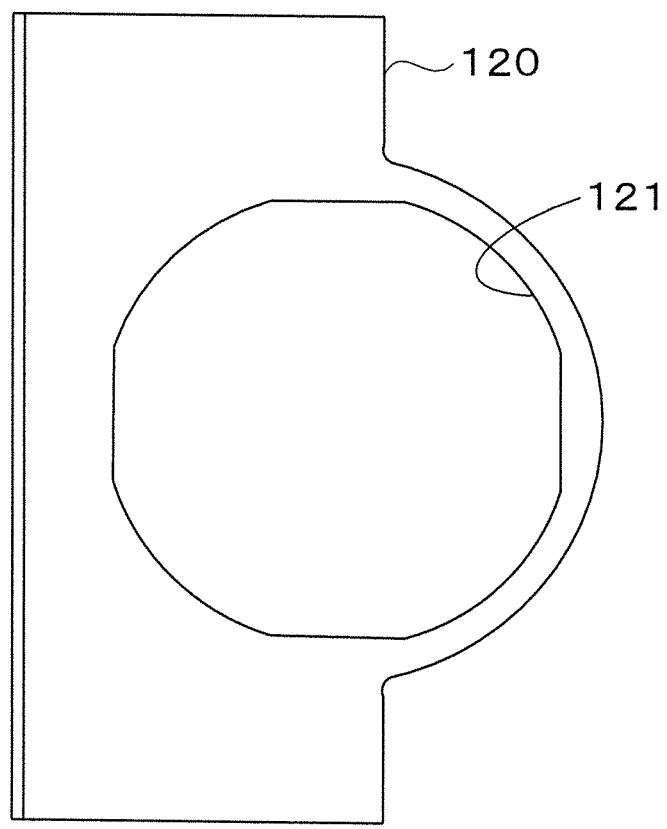
FIG. 5 is a view illustrating a bracket according to an embodiment.
Figure 6:
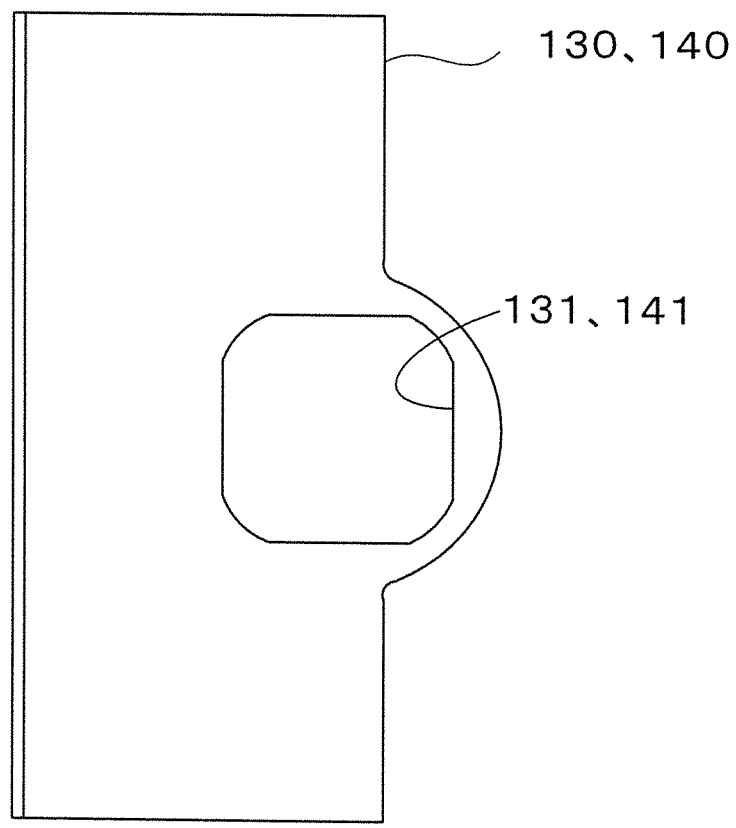
FIG. 6 is a view illustrating brackets according to an embodiment.

The first bracket 120 includes an opening 121 into which the large-diameter hollow tube 200 is fit, as illustrated in FIG. 5. The second bracket 130 and the third bracket 140 have the same shape, and include openings 131 and 141, respectively, into which the small-diameter hollow tube 300 is fit, as illustrated in FIG. 6.

Referring again to FIG. 1, the stays 150A and 150B are members that support the instrument panel. One ends of the stays 150A and 150B are mounted on the small-diameter hollow tube 300, and other ends of the stays 150A and 150B are mounted on the predetermined positions of the instrument panel.

A method of producing an instrument panel beam assembly 100 will now be described. The method of producing the instrument panel beam assembly 100 includes a molding step of molding an instrument panel beam 110, a bracket mounting step of mounting first to third brackets 120 to 140, and a stay mounting step of mounting stays 150A and 150B.

First, the molding step in which the instrument panel beam 110 is molded by drawing processing will be described with reference to FIG. 7.

Figure 7A:
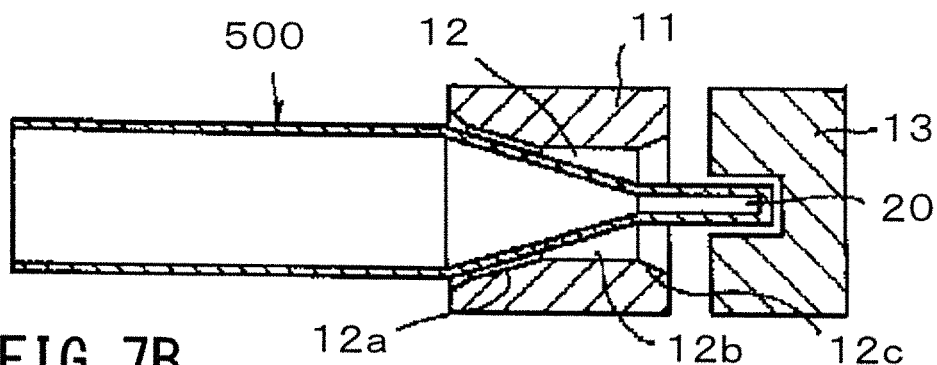
FIG. 7A to FIG. 7D are views illustrating a molding step of molding an instrument panel beam according to an embodiment.

First, a hollow material 500 including an aluminum alloy or the like is prepared as illustrated in FIG. 7A. The hollow material 500 has the same cross-sectional shape as that of the large-diameter hollow tube 200 illustrated in FIG. 3. A crushed portion 20 is formed in an end of the hollow material 500. The crushed portion 20 is a portion that is formed in advance by swaging processing and that is gripped by a chuck 13 in a drawing apparatus in drawing processing.

Then, a die 11 including a hole 12 of which the outside dimension is smaller than a cross section of the hollow material 500 is prepared. The hole 12 includes a tapered drawer 12a, a bearing 12b, and an escape 12c. The inner periphery portion of the bearing 12b has a shape along the outer periphery portion of the small-diameter hollow tube 300 illustrated in FIG. 4. As a result, the outer periphery portion of the small-diameter hollow tube 300 can be formed. The crushed portion 20 of the hollow material 500 is passed through the hole 12 of the die 11.

Figure 7B:
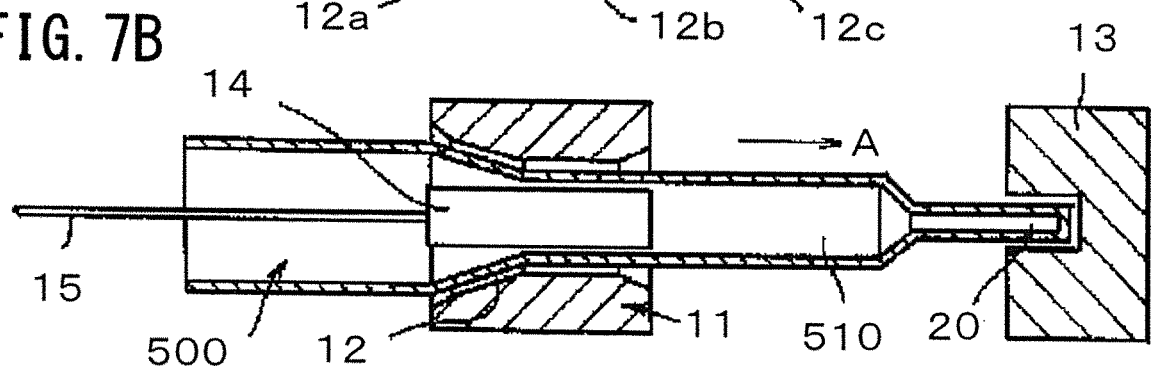

Then, a plug 14 is inserted into the interior of the hollow material 500 passed through the hole 12 of the die 11 to position the plug 14 on the central axis in the die 11, as illustrated in FIG. 7B. The outer periphery portion of the plug 14 has a shape along the inner periphery portion of the small-diameter hollow tube 300 illustrated in FIG. 4. As a result, the inner periphery portion of the small-diameter hollow tube 300 can be formed. The plug 14 is supported by a support rod 15 that is driven by a drive apparatus which is not illustrated, and is inserted into or pulled out of the interior of the hollow material 500 by movement of the support rod 15. Further, the crushed portion 20 of the hollow material 500, which protrudes through the outlet of the die 11, is gripped by the chuck 13 of the drawing apparatus. Examples of the drawing apparatus include conventionally used drawbenches.

Then, the drawing apparatus is driven to move the chuck 13 in an A-direction. Pulling of the crushed portion 20 of the hollow material 500 in the A-direction by the chuck 13 allows the hollow material 500 to be passed and drawn through a gap between the plug 14 and the bearing 12b of the hole 12 of the die 11. Drawing processing of the hollow material 500 through the hole 12 of the die 11 is continuously performed by the chuck 13. As a result, the outer periphery portion of a small-diameter portion 510 passed through the hole 12 of the die 11 is molded to have the same shape and size as those of the inner periphery portion of the hole 12 of the die 11, and the wall thickness of the small-diameter portion 510 is defined by the inner periphery portion of the hole 12 of the die 11 and the outer periphery portion of the plug 14.

Figure 7C:
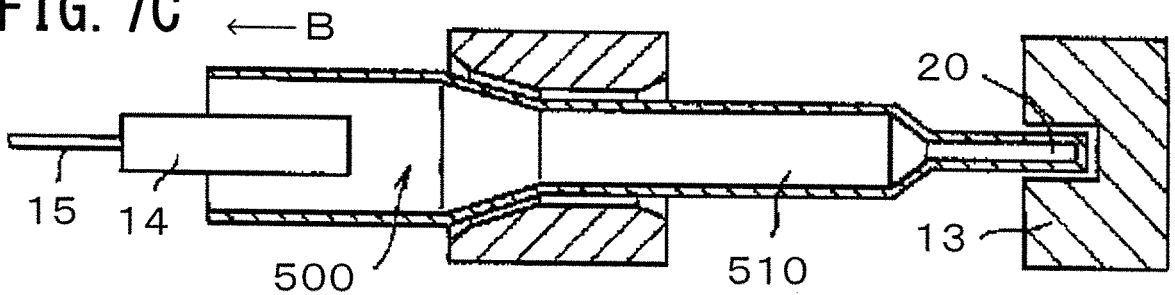

Then, drawing of the support rod 15 in a back direction B by the drive apparatus at the time of drawing processing of the hollow material 500 between the predetermined lengths by the chuck 13 allows the plug 14 inserted into the interior of the hollow material 500 to be moved in the back direction B and to be outward pulled out of the hollow material 500, as illustrated in FIG. 7C.

Figure 7D:
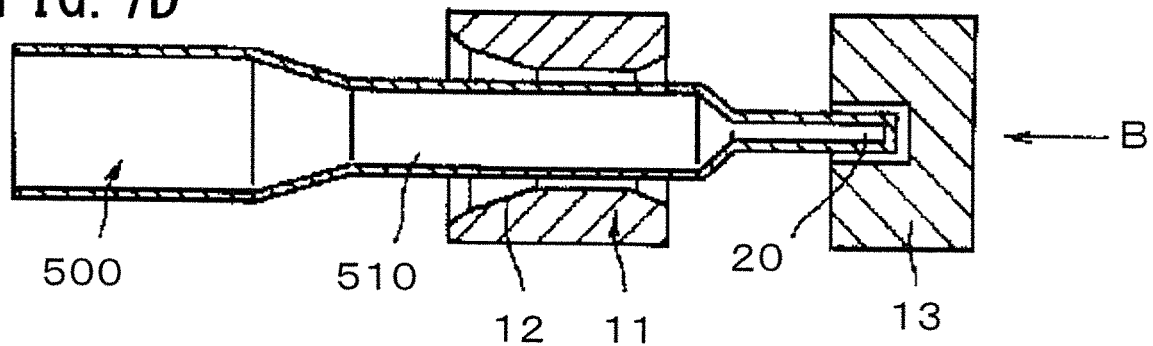

Then, pushing of the chuck 13 in the back direction B allows the hollow material 500 to be pushed and moved toward the back direction B by the chuck 13 and allows the small-diameter portion 510 to be moved toward the back direction B through the hole 12 of the die 11, as illustrated in FIG. 7D. When the hollow material 500 is returned and moved to the original position of the hollow material 500 prior to the drawing processing, the chuck 13 cancels the gripping of the crushed portion 20 of the hollow material 500.

In such a manner, the small-diameter portion 510 having a cross section portion of which the outer diameter is smaller than a cross section of the hollow material 500 prior to the drawing processing is formed in the hollow material 500. The instrument panel beam 110 including the large-diameter hollow tube 200 and the small-diameter hollow tube 300 is obtained by cutting both ends of the formed hollow material so that the hollow material has a desired length.

In the bracket mounting step, the first to third brackets 120 to 140 are mounted. The first bracket 120 is molded in a shape having an opening 121 into which the large-diameter hollow tube 200 is fit, and is mounted on another end of the large-diameter hollow tube 200. The second bracket 130 and the third bracket 140 are molded in a shape having an opening 131 into which the small-diameter hollow tube 300 is fit. The second bracket 130 is mounted on another end of the small-diameter hollow tube 300. The third bracket 140 is mounted at the predetermined position of the small-diameter hollow tube 300 (the center position of the instrument panel beam 110).

In the stay mounting step, the first and second stays 150A and 150B are mounted. One ends of the first and second stays 150A and 150B are mounted on the small-diameter hollow tube 300.

As described above, the instrument panel beam assembly 100 is produced by the molding step, the bracket mounting step, and the stay mounting step.

According to the instrument panel beam assembly 100 according to the present embodiment, flexural rigidity and torsional rigidity against a load from an optional direction can be improved because the large-diameter hollow tube 200 and the small-diameter hollow tube 300 include four flat plates and four bends. The thickness t1 of the large-diameter hollow tube 200 and the thickness t2 of the small-diameter hollow tube 300 can be reduced while maintaining torsional rigidity and flexural rigidity because the large-diameter hollow tube 200 particularly requiring torsional rigidity has a cross-sectional shape similar to a circular shape, and the width W of flat plates 310a and 310b of which the principal surfaces are horizontally arranged when the small-diameter hollow tube 300 is arranged in an automobile is large in the small-diameter hollow tube 300 requiring flexural rigidity against a frontal collision. Because the thicknesses t1 and t2 can be decreased, the mass of the instrument panel beam assembly 100 can be reduced.

Accordingly, the instrument panel beam assembly 100 can have a small mass while having high torsional rigidity and high flexural rigidity.

Since the instrument panel beam 110 includes the flat plates, and the first to third brackets 120 to 140 include the openings 121 to 141 into which the outer periphery portion of the instrument panel beam 110 is fit, deviations between the first to third brackets 120 to 140 and the instrument panel beam 110 in a rotation direction can be prevented, thereby reducing troubles in later steps. Since the instrument panel beam 110 includes the flat plate portions, it becomes easy to mount the stays 150A and 150B as components to be mounted.

The embodiments of the present disclosure have been described above. However, the present disclosure is not limited to the embodiments described above but may be subjected to various modifications and applications.

Figure 8:
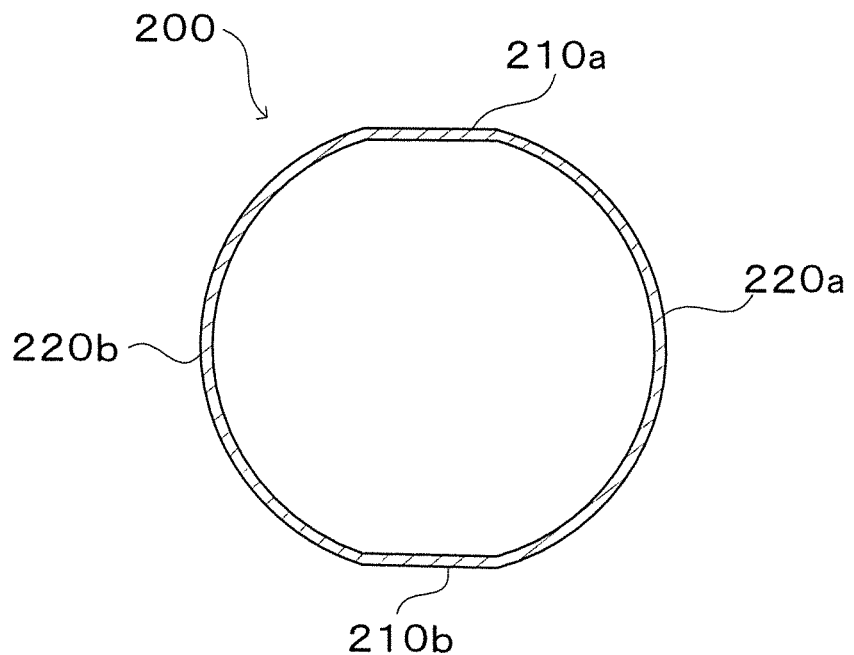
FIG. 8 is a cross-sectional view of an instrument panel beam according to an alternative example.
Figure 9:
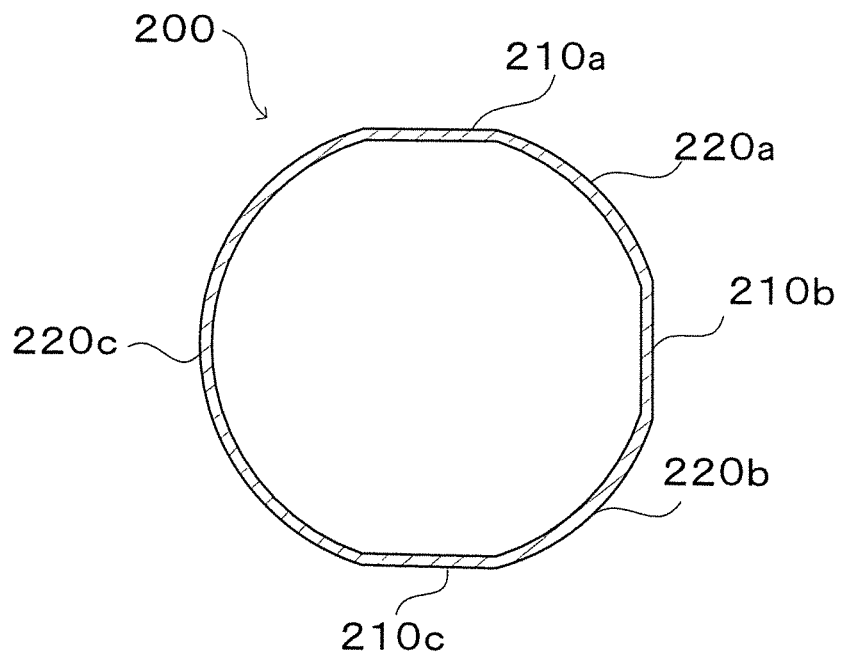
FIG. 9 is a cross-sectional view of an instrument panel beam according to an alternative example.

A case in which the large-diameter hollow tube 200 includes the flat plates 210a, 210b, 210c, and 210d as well as the bends 220a, 220b, 220c, and 220d has been described in the above-described embodiments. However, the shape of the large-diameter hollow tube 200 is not particularly limited but may be a hollow cylindrical shape. When the large-diameter hollow tube 200 has a hollow cylindrical shape, torsional rigidity can be increased. The large-diameter hollow tube 200 preferably includes at least two flat plates and at least two bends. The large-diameter hollow tube 200 may include two flat plates 210a and 210b as well as two bends 220a and 220b, for example, as illustrated in FIG. 8, may include three flat plates 210a, 210b, and 210c as well as three bends 220a, 220b, and 220c, as illustrated in FIG. 9, and may include five or more flat plates and five or more bends.

Figure 10:
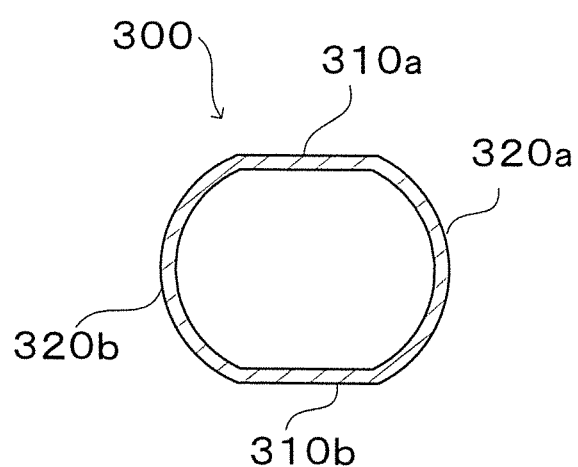
FIG. 10 is a cross-sectional view of an instrument panel beam according to an alternative example.
Figure 11:
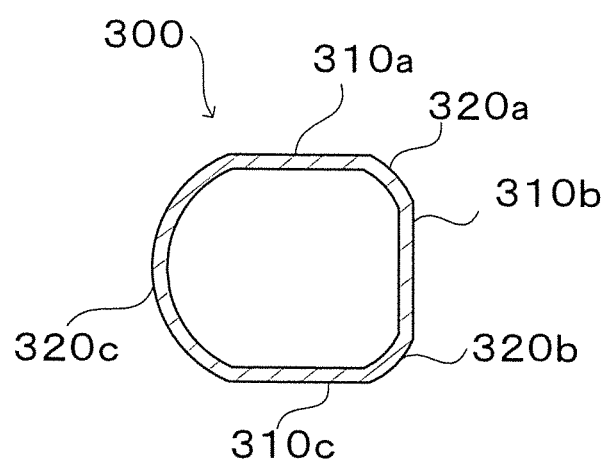
FIG. 11 is a cross-sectional view of an instrument panel beam according to an alternative example.

A case in which the small-diameter hollow tube 300 includes the four flat plates 310a, 310b, 310c, and 310d as well as the four bends 320a, 320b, 320c, and 320d has been described in the above-described embodiments. However, the small-diameter hollow tube 300 may include at least two flat plates and at least two bends. The small-diameter hollow tube 300 may include two flat plates 310a and 310b as well as two bends 320a and 320b, as illustrated in FIG. 10, may include three flat plates 310a, 310b, and 310c as well as three bends 320a, 320b, and 320c, as illustrated in FIG. 11, and may include five or more flat plates and five or more bends.

An example in which molding is performed by the drawing processing using the die 11 and the plug 14 in the molding step of molding the instrument panel beam 110 has been described in the above-described embodiments. However, the molding may be performed by drawing the hollow material 500 passed through the hole 12 of the die 11 without using the plug 14 in the molding step of molding the instrument panel beam 110. The method of molding the instrument panel beam 110 need not be a method in which molding is performed by drawing processing. The method is not limited as long as enabling a material such as an aluminum alloy to be molded into the shape of the instrument panel beam 110.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2017-16128, filed on Jan. 31, 2017, and includes the specification, claims, all drawings thereof. The entire disclosure of the patent application is incorporated herein by reference.

REFERENCE SIGNS LIST

100 Instrument panel beam assembly
110 Instrument panel beam
120 First bracket
121 Opening
130 Second bracket
131 Opening
140 Third bracket
141 Opening
150A, 150B Stay
200 Large-diameter hollow tube
210a to 210d Flat plate
220a to 220d Bend
300 Small-diameter hollow tube
310a to 310d Flat plate
320a to 320d Bend
400 Reduced diameter portion
500 Hollow material
510 Small-diameter portion
11 Die
12 Hole
12a Drawer
12b Bearing
12c Escape
13 Chuck
14 Plug
15 Support rod
20 Crushed portion
R1, R2 Curvature radius
D1, D2 Outer diameter
CD Circumferential direction
RD Radial direction
L1 Full length
L2, L3 Length
W1, W2 Width
t1, t2 Thickness
B Back direction

The invention claimed is:

1. An instrument panel beam that extends in a width direction of an automobile, the instrument panel beam comprising:
   a large-diameter hollow tube having a hollow cylindrical shape; and
   a small-diameter hollow tube having a diameter that is smaller than that of the large-diameter hollow tube and having a hollow cylindrical shape,
   wherein
   the large-diameter hollow tube and the small-diameter hollow tube are joined to each other in an axial direction,
   the small-diameter hollow tube comprises at least two flat plates that extend in a longitudinal direction and at least two bends that are curved in a circumferential direction, the flat plates and the bends being alternately arranged in the circumferential direction,
   the large-diameter hollow tube comprises at least two flat plates that extend in a longitudinal direction and at least two bends that are curved in a circumferential direction, the flat plates and the bends being alternately arranged in the circumferential direction, and
   each flat plate of the small-diameter hollow tube has a width that is greater than that of each flat plate of the large-diameter hollow tube.

2. The instrument panel beam according to wherein
   the at least two bends of the large-diameter hollow tube have a curved surface shape that is convex outward in a radial direction.

3. The instrument panel beam according to claim 1, wherein
   the at least two bends of the small-diameter hollow tube have a curved surface shape that is convex outward in a radial direction.

4. The instrument panel beam according to claim 1, comprising a reduced diameter portion of which a diameter is reduced from one end to another end,
   wherein the one end of the reduced diameter portion is fixed to an end of the large-diameter hollow tube, and the other end is fixed to an end of the small-diameter hollow tube.

5. The instrument panel beam according to claim 1, wherein
   a curvature radius of the bends of the large-diameter hollow tube is larger than a curvature radius of the bends of the small-diameter hollow tube.

6. A pair of brackets into which the instrument panel beam according to claim 1 is fit, the pair of brackets comprising:
   a first bracket comprising an opening into which the large-diameter hollow tube of the instrument panel beam is fit; and
   a second bracket comprising an opening into which the small-diameter hollow tube of the instrument panel beam is fit.

7. An instrument panel beam assembly comprising:
   the instrument panel beam according to claim 1;
   a first bracket comprising an opening into which the large-diameter hollow tube of the instrument panel beam is fit; and
   a second bracket comprising an opening into which the small-diameter hollow tube of the instrument panel beam is fit,
   wherein the instrument panel beam is fit into the first bracket and the second bracket.

* * * * *